United States Patent
Wang et al.

(10) Patent No.: US 10,949,573 B2
(45) Date of Patent: Mar. 16, 2021

(54) UNLOCKING CONTROL METHODS AND RELATED PRODUCTS

(71) Applicant: GUANGDONG OPPO MOBILE TELECOMMUNICATIONS CORP., LTD., Guangdong (CN)

(72) Inventors: Jian Wang, Guangdong (CN); Kui Jiang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 74 days.

(21) Appl. No.: 16/055,229

(22) Filed: Aug. 6, 2018

(65) Prior Publication Data

US 2019/0080119 A1 Mar. 14, 2019

(30) Foreign Application Priority Data

Sep. 8, 2017 (CN) .......................... 201710807808.4

(51) Int. Cl.
*G06F 21/84* (2013.01)
*G06K 9/00* (2006.01)
(Continued)

(52) U.S. Cl.
CPC ............ *G06F 21/84* (2013.01); *G06F 3/0481* (2013.01); *G06F 21/32* (2013.01);
(Continued)

(58) Field of Classification Search
CPC ........... G06K 9/00899; G06K 9/00221; G06K 9/00268; G06F 21/32; H04L 29/06816; H04N 21/4415
See application file for complete search history.

(56) References Cited

U.S. PATENT DOCUMENTS

| 6,915,518 B1* | 7/2005 | Jacobson | ............... G06F 9/505 710/104 |
| 2003/0023660 A1* | 1/2003 | Kosanovic | .............. G06F 9/505 718/104 |

(Continued)

FOREIGN PATENT DOCUMENTS

| CN | 102004906 | 4/2011 |
| CN | 102866844 | 1/2013 |

(Continued)

OTHER PUBLICATIONS

Lalit Agarwa, Ask Me Again But Don't Annoy Me: Evaluating Re-authentication Strategies for Smartphones (Year: 2016).*

(Continued)

*Primary Examiner* — Ali S Abyaneh
(74) *Attorney, Agent, or Firm* — Hodgson Russ LLP

(57) ABSTRACT

Embodiments of the present disclosure provide unlocking control methods and related produces. The method includes the following. A face image is collected. A first operation and a second operation are performed in parallel. The first operation is configured to detect whether the face image is a real face image. The second operation is configured to extract feature data of the face image. The feature data of the face image is matched with feature data of a preset face template when the feature data of the face image is extracted and the face image is detected to be the real face image. An unlocking operation is performed when the feature data of the face image is matched with the feature data of the preset face template.

20 Claims, 6 Drawing Sheets

(51) Int. Cl.
*G06F 21/32* (2013.01)
*G06F 3/0481* (2013.01)
*G06K 9/62* (2006.01)

(52) U.S. Cl.
CPC ..... *G06K 9/00221* (2013.01); *G06K 9/00268* (2013.01); *G06K 9/00899* (2013.01); *G06K 9/00993* (2013.01); *G06K 9/6202* (2013.01); *G06F 2221/2149* (2013.01)

(56) References Cited

U.S. PATENT DOCUMENTS

| | | | | |
|---|---|---|---|---|
| 2012/0054519 | A1* | 3/2012 | Branover | G06F 1/3296 713/322 |
| 2014/0016837 | A1* | 1/2014 | Nechyba | G06K 9/00221 382/118 |
| 2015/0362979 | A1* | 12/2015 | Wu | G06F 1/3215 345/173 |

FOREIGN PATENT DOCUMENTS

| | | |
|---|---|---|
| CN | 103677548 | 3/2014 |
| CN | 104598870 | 5/2015 |
| CN | 104636734 | 5/2015 |
| CN | 105095829 | 11/2015 |
| CN | 105117628 | 12/2015 |
| CN | 105243376 | 1/2016 |
| CN | 105354473 | 2/2016 |
| CN | 105426730 | 3/2016 |
| CN | 105631430 | 6/2016 |
| CN | 105760817 | 7/2016 |
| CN | 106203038 | 12/2016 |
| CN | 106446816 | 2/2017 |
| CN | 107087053 | 8/2017 |
| CN | 107092820 | 8/2017 |
| CN | 107622191 | 1/2018 |
| CN | 107622232 | 1/2018 |
| EP | 2680191 | 1/2014 |

OTHER PUBLICATIONS

SIPO, Second Office Action for CN Application No. 201710807808. 4, dated Jun. 27, 2019.
Agarwal et al., "Ask Me Again But Don't Annoy Me: Evaluating Re-authentication Strategies for Smartphones," Proceedings of the Twelfth Symposium on Usable Privacy and Security (SOUPS 2016), USENIX The Advanced Computing Systems Association, 2016, pp. 221-236.
Tian et al., "Spoofing Detection for Embedded Face Recognition System Using a Low Cost Stereo Camera," 23rd International Conference on Pattern Recognition (ICPR), 2016, pp. 1017-1022.
EPO, Office Action for EP Application No. 18188015, dated Feb. 12, 2019.
SIPO, First Office Action for CN Application No. 201710807808, dated Mar. 19, 2019.
WIPO, English Translation of ISR/WO for PCT/CN2018/099671, dated Nov. 13, 2018.
EPO, Communication for EP Application No. 18188015A, dated Dec. 10, 2020.
IPI, Office Action for in Application No. 201834029388, dated Nov. 2, 2020.

* cited by examiner

UNLOCKING CONTROL METHODS AND RELATED PRODUCTS

CROSS REFERENCE TO RELATED APPLICATION

This application is based upon and claims a priority to Chinese Patent Application No. 201710807808.4, filed on Sep. 8, 2017, the entire content of which is incorporated herein by reference for all purpose.

TECHNICAL FIELD

The present disclosure relates to a field of mobile terminal technologies, and more particularly, to an unlocking control method and related products.

BACKGROUND

With the popularization of smartphones, the smartphones may support more and more applications and have more and more functions. The smartphones are developing to be diversified and personalized, becoming an indispensable electronic product in the user's life.

At present, with the increasing security requirements for the smartphones, various biological information unlocking solutions have emerged, such as fingerprint unlocking, face unlocking, iris unlocking, etc. The face unlocking becomes the first choice for many smartphones since it has a faster unlocking speed and a higher recognition success rate.

SUMMARY

In a first aspect, an embodiment of the present disclosure provides a mobile terminal, including a processor, a face image collecting device and a memory. The face image collecting device is configured to collect a face image. The memory is configured to store feature data of a preset face template. The processor is configured to carry out following actions, including: performing a first operation and a second operation in parallel, the first operation being configured to detect whether the face image is a real face image, the second operation being configured to extract feature data of the face image; matching the feature data of the face image with the feature data of the preset face template when the feature data of the face image is extracted and the face image is detected to be the real face image; and performing an unlocking operation when the feature data of the face image matches the feature data of the preset face template.

In a second aspect, an embodiment of the present disclosure provides an unlocking control method. The method includes the following. A face image is collected. A first operation and a second operation are performed in parallel. The first operation is configured to detect whether the face image is a real face image. The second operation is configured to extract feature data of the face image. The feature data of the face image is matched with the feature data of the preset face template when the feature data of the face image is extracted and the face image is detected to be the real face image. An unlocking operation is performed when the feature data of the face image matches the feature data of the preset face template.

In a third aspect, an embodiment of the present disclosure provides a computer readable storage medium having stored computer programs for electronic data exchange. The computer programs cause a computer to perform a part of or all acts of the method of the second aspect of the embodiments of the present disclosure as described above. The computer includes a mobile terminal.

BRIEF DESCRIPTION OF THE DRAWINGS

To clearly illustrate embodiments of the present disclosure or technical solutions in the prior art, a brief description of drawings used in embodiments or in the prior art descriptions is given below. Obviously, the drawings in the following descriptions are only part embodiments of the present disclosure, and for those skilled in the art, other drawings can be obtained according to these drawings without creative labor.

DETAILED DESCRIPTION

Figure 1:
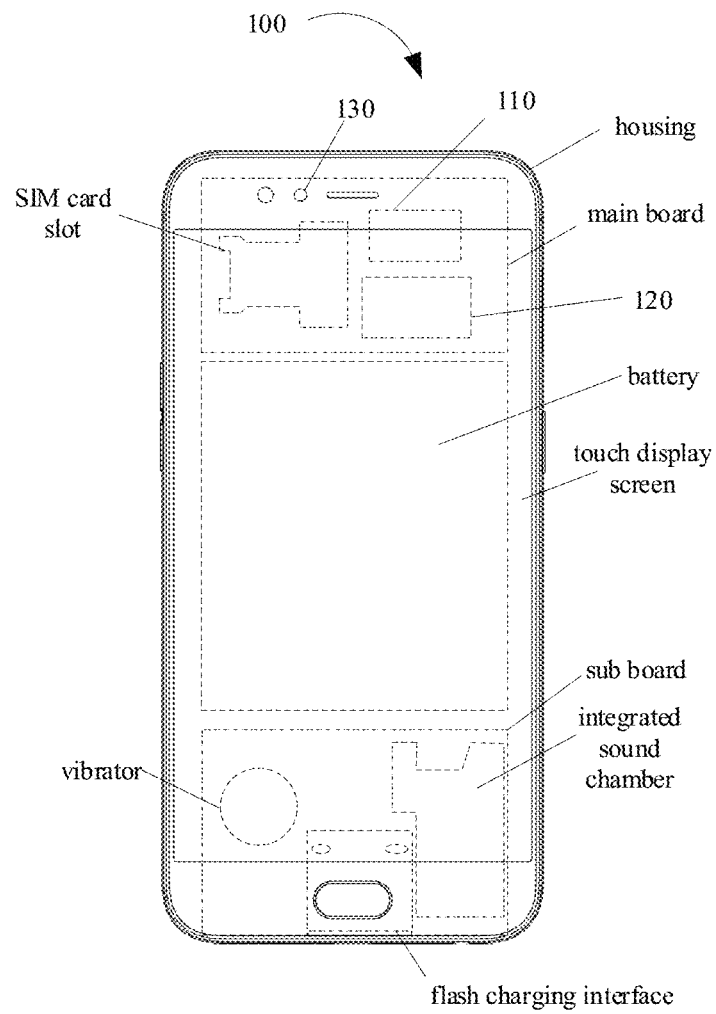
FIG. 1 is a schematic diagram illustrating a mobile terminal according to an embodiment of the present disclosure.

To make those skilled in the art a better understanding of solutions of the present disclosure, the technical solutions in the embodiments of the present disclosure will be clearly and completely described in the following with reference to the drawings in the embodiments of the present disclosure. Obviously, the described embodiments are only a part of the embodiments of the present disclosure, and not all the embodiments. All other embodiments obtained by those skilled in the art based on the embodiments of the present disclosure without creative efforts are within the scope of the present disclosure.

In the specification, claims and the above drawings of the present disclosure, terms of "first" and "second" are only used for distinguishing different objects, not describing a specific order. It should be further understood that, when used in the specification, terms "comprising", "containing" and any transformations cover a non-exclusive inclusion. For example, a process, method, system, product, or device that comprises a series of acts or units is not limited to the listed acts or units, but optionally also includes acts or units not listed, or, optionally other acts or units inherent to these process, method, product, or device.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The mobile terminal related in the embodiments of the present disclosure may include handheld devices having wireless communication functions, in-vehicle devices, wearable devices, computing devices, other processing devices coupled to wireless modems, user equipment (UE), mobile stations (MS), terminal devices, and the like. For convenience of description, the devices mentioned above are collectively referred to as mobile terminals.

The present disclosure relates to a mobile terminal. The mobile terminal includes a processor, a face image collecting device and a memory. The face image collecting device is configured to collect a face image. The memory is configured to store feature data of a preset face template. The processor is configured to carry out following actions, including: performing a first operation and a second operation in parallel, the first operation being configured to detect whether the face image is a real face image, the second operation being configured to extract feature data of the face image; matching the feature data of the face image with the feature data of the preset face template when the feature data of the face image is extracted and the face image is detected to be the real face image; and performing an unlocking operation when the feature data of the face image matches the feature data of the preset face template.

The present disclosure relates to an unlocking control method. The method includes the following. A face image is collected. A first operation and a second operation are performed in parallel. The first operation is configured to detect whether the face image is a real face image. The second operation is configured to extract feature data of the face image. The feature data of the face image is matched with the feature data of the preset face template when the feature data of the face image is extracted and the face image is detected to be the real face image. An unlocking operation is performed when the feature data of the face image matches the feature data of the preset face template.

The present disclosure relates to a mobile terminal including a processing unit and a collecting unit. The collecting unit is configured to collect a face image. The processing unit is configured to carry out following actions, including: performing a first operation and a second operation in parallel, the first operation being configured to detect whether the face image is a real face image, the second operation being configured to extract feature data of the face image; matching the feature data of the face image with feature data of a preset face template when the feature data of the face image is extracted and the face image is detected to be the real face image; and performing an unlocking operation when the feature data of the face image matches the feature data of the preset face template.

The present disclosure relates to a mobile terminal including a processor, a memory, a communication interface and one or more programs. The one or more programs are stored in the memory and configured to be executed by the processor to implement instructions of acts in the above method.

The present disclosure relates to a computer readable storage medium having stored computer programs for electronic data exchange. The computer programs cause a computer to perform a part of or all acts of the above method. The computer includes a mobile terminal.

The mobile terminal described in the embodiment of the present disclosure is provided with a face image collecting device. The face image collecting device may be a general camera module, such as a front camera. The embodiments of the present disclosure will be described in detail below.

FIG. 1 is a schematic diagram illustrating a mobile terminal 100 according to an embodiment of the present disclosure. As illustrated in FIG. 1, the mobile terminal 100 includes a housing, a touch display screen, a main board, a battery and a sub board. The main board is provided with a processor 110, a memory 120, a front camera 130, a subscriber identification module (SIM) card slot, etc. The sub board is provided with a vibrator, an integrated sound chamber and a VOOC (Voltage Open Loop Multi-Step Constant-Current Charging) flash charging interface. The front camera 130 forms the face image collecting device of the mobile terminal 100.

The face image collecting device 130 is configured to collect a face image.

The memory 120 is configured to store feature data of a preset face template.

The processor 110 is configured to carry out following actions. A first operation and a second operation are performed in parallel, in which the first operation is configured to detect whether the face image is a real face image and the second operation is configured to extract feature data of the face image. The feature data of the face image is matched with the feature data of the preset face template when the feature data of the face image is extracted and the face image is detected to be the real face image. An unlocking operation is performed when the feature data of the face image matches the feature data of the preset face template.

The face image collecting device 130 and the memory 120 are coupled to the processor 110.

The processor 110 is a control center of the mobile terminal. The processor 110 may be coupled to various parts of the entire mobile terminal by various interfaces and wires. The processor 110 may perform various functions and process data to perform overall monitoring on the mobile terminal by running or executing software programs and/or modules stored in the memory 120, and invoking data stored in the memory 120. Alternatively, the processor 110 may be integrated with an application processor and a modem processor. The application processor mainly processes an operating system, user interfaces, applications, and the like. The modem processor mainly processes the wireless communication. It may be understood that the above modem processor may be not integrated into the processor 110.

The memory 120 may be configured to store software programs and modules. The processor 110 may execute various functional applications and data processing in the mobile terminal by running software programs and modules stored in the memory 120. The memory 120 may mainly include a storage program area and a storage data area. The storage program region may store an operation system, at least one function-required applications and the like. The storage data area may store data produced by using the mobile terminal, and the like. Moreover, the memory 120 may include a high speed random access memory and may further include a non-volatility memory, such as at least one disk memory, a flash memory, or other volatility solid state memory.

In the embodiments of the present disclosure, the face image is collected; the first operation and the second operation are performed in parallel, in which the first operation is to detect whether the face image is the real face image, and the second operation is to extract the feature data of the face image; when the feature data of the face image is extracted, and the face image is detected be the real face image, the feature data of the face image is matched with the feature data of the preset face template; and the unlocking operation is performed when the feature data of the face image matches the feature data of the preset face template. It may be seen that the security of the face unlocking on the mobile terminal may be improved by means of determining by the mobile terminal whether the face image is the real face image. Further, by performing the first operation and the second operation in parallel, instead of serially performing the first operation and the second operation, it is beneficial to reduce the time consumption and improve the speed of the unlocking control on the mobile terminal. In addition, when the face image is detected to be the real face image, the operation of matching the feature data of the face image with the feature data of the preset face template is performed, other than blindly performing the matching operation when it is uncertain whether the face image is the real face image, such that it is advantageous to reduce the power consumption of the mobile terminal.

In one or more embodiments, the unlocking operation may be performed as follows. A third operation and a fourth operation are performed in parallel. The third operation is configured to remove a screen locked interface and load a system desktop. The fourth operation is configured to light a touch display screen.

In one or more embodiments, the processor 100 is further configured to carry out the following action. A screen locked interface is transparentized and a system desktop is loaded when the feature data of the face image is extracted. The unlocking operation may be performed as follows. A third operation and a fourth operation are performed in parallel. The third operation is configured to light a touch display screen. The fourth operation is configured to remove the screen locked interface.

In one or more embodiments, the processor 110 is configured to perform the first operation at a first time point for a first reference duration and perform the second operation at a second time point for a second reference duration. A time difference between the first time point and the second time point is less than a time difference between the first reference duration and the second reference duration.

In one or more embodiments, the processor 110 is further configured to carry out the following actions. Before matching the feature data of the face image with the feature data of the preset face template, an amount of the feature data is obtained. An amount of system resources required to perform feature data matching is determined based on the amount of the feature data. The amount of system resources is assigned to perform the operation of matching the feature data with the feature data of the preset face template.

In one or more embodiments, the processor 110 is configured to perform the third operation at a third time point for a third reference duration and perform the fourth operation at a fourth time point for a fourth reference duration. A time difference between the third time point and the fourth time point is less than a time difference between the third reference duration and the fourth reference duration.

In one or more embodiments, the first operation is performed as follows. A first system resource is allocated to the first operation and the first operation is performed based on the first system resource. The second operation is performed as follows. A second system resource is allocated to the second operation and the second operation is performed based on the second system resource. The second system resource is smaller than the first system resource.

Figure 2A:
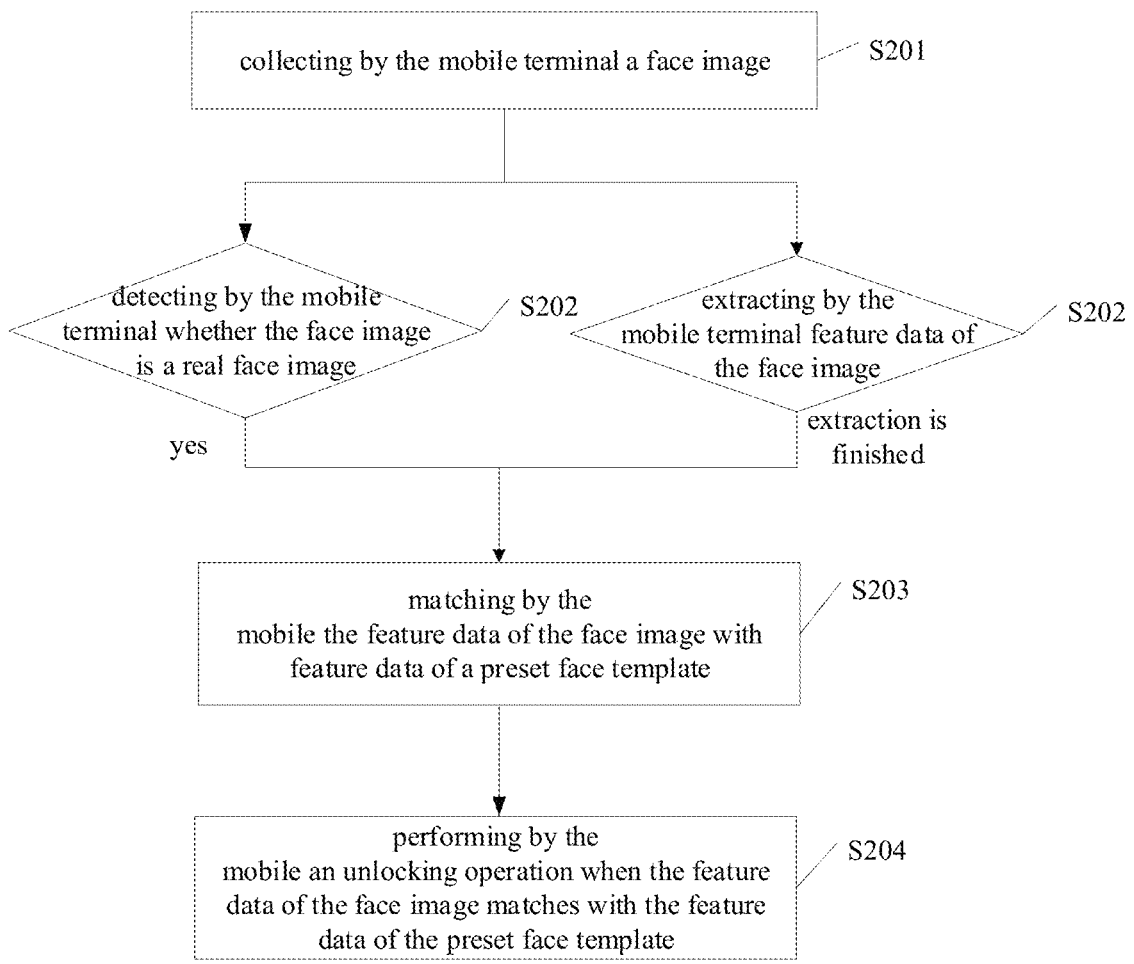
FIG. 2A is a flow chart illustrating an unlocking control method according to an embodiment of the present disclosure.

FIG. 2A is a flow chart illustrating an unlocking control method according to an embodiment of the present disclosure. The method may be applicable to the mobile terminal. As illustrated in FIG. 2A, the unlocking control method includes the actions in the following blocks.

At block S201, the mobile terminal collects a face image.

In one or more embodiments, before the mobile terminal collects the face image, the method further includes: a to-be-unlocked event is detected; and a front camera is turned on to capture the face image based on the to-be-unlocked event.

The to-be-unlocked event may be, for example, a desktop-to-be-unlocked event, an application-to-be-unlocked event, a file-to-be-unlocked event, and the like, which are not limited herein. The desktop-to-be-unlocked event is a to-be-unlocked event to a screen locked desktop. The application-to-be-unlocked event is a to-be-unlocked event to a specific operation of the application, such as application launch, application deletion, etc. The file-to-be-unlocked event is a to-be-unlocked event to a file, such as the to-be-unlocked event to the target file.

The mobile terminal may detect the to-be-unlocked event in a screen-off state or in a screen-on state. A trigger condition for detecting the to-be-unlocked event may be a touch operation, a pressing operation, a voice and the like of the user. For example, for the mobile terminal with a screen-off standby state, the to-be-unlocked event may be triggered by long-pressing the touch display screen. The trigger condition is not limited herein.

At block S202, the mobile terminal performs a first operation and a second operation in parallel. The first operation is configured to detect whether the face image is a real face image. The second operation is configured to extract feature data of the face image.

The manner of detecting whether the face image is the real face image may be various. For example, it is detected whether temperature distribution of the face conforms to temperature distribution of the real face by using an infrared sensor, or whether the face image is a three-dimensional face image or the like, which is not limited herein.

The performing of the first operation and the second operation in parallel may be a dual-process parallel operation of the operating system, or a dual-thread parallel operation of one process, or parallel operations of two central processing units (CPUs) of the dual-core system, which is not limited herein.

At block S203, the feature data of the face image is matched with feature data of a preset face template when the feature data of the face image is extracted and the face image is detected to be the real face image.

When a matching degree between the face image and the preset face template is greater than a preset threshold, the face image is matched with the preset face template. The preset threshold may be varied with the to-be-unlocked event, which is not limited herein.

At block S204, an unlocking operation is performed when the feature data of the face image matches with the feature data of the preset face template.

The above-mentioned implementation manner of performing by the mobile terminal the unlocking operation may be switching the mobile terminal from a current state to an unlocked state. The current state may include a screen locked state, a disabled state, and the like, which are not specifically limited herein.

The preset face template is a face feature data template. The face feature data template refers to a set of correspondences between locations of feature points of the registered user's face and feature values of the feature points (the feature value may be a capacitance value, an inductance value, a voltage value, a current value, a relative value, etc.).

In the embodiments of the present disclosure, the face image is collected; the first operation and the second operation are performed in parallel, in which the first operation is to detect whether the face image is the real face image, and the second operation is to extract the feature data of the face image; when the feature data of the face image is extracted, and the face image is detected be the real face image, the feature data of the face image is matched with the feature data of the preset face template; and the unlocking operation is performed when the feature data of the face image matches the feature data of the preset face template. It may be seen that the security of the face unlocking on the mobile terminal may be improved by means of determining by the mobile terminal whether the face image is the real face image. Further, by performing the first operation and the second operation in parallel, instead of serially performing the first operation and the second operation, it is beneficial to reduce the time consumption and improve the speed of the unlocking control on the mobile terminal. In addition, when the face image is detected to be the real face image, the operation of matching the feature data of the face image with the feature data of the preset face template is performed, rather than blindly performing the matching operation when it is uncertain whether the face image is the real face image, such that it is advantageous to reduce the power consumption of the mobile terminal.

In one or more embodiments, the unlocking operation may be performed as follows. A third operation and a fourth operation are performed in parallel. The third operation is configured to remove a screen locked interface and load a system desktop. The fourth operation is configured to light a touch display screen.

The to-be-unlocked event is a screen-off unlocking event.

The third operation may be performed at a third time point for a third reference duration, and the fourth operation may be performed at a fourth time point for a fourth reference duration. A time difference between the third time point and the fourth time point is less than a time difference between the third reference duration and the fourth reference duration.

The third time point and the fourth time point may be the same time point or different time points.

In this example, the mobile terminal performs the third operation and the fourth operation in parallel on the basis of performing the first operation and the second operation in parallel. The parallel operations may be performed twice, which may further improve the speed of the unlocking process on the mobile terminal. Further, the touch display screen may be lighted when the face image matches the preset face template and is the real face image, reducing the power consumption of the mobile terminal.

In one or more embodiments, the method may further include the following. A screen locked interface is transparentized and a system desktop is loaded. The unlocking operation may be performed as follows. A third operation and a fourth operation are performed in parallel. The third operation is configured to light a touch display screen. The fourth operation is configured to remove the screen locked interface.

The to-be-unlocked event is a screen-off unlocking event.

The transparentizing of the screen locked interface is to set a transparency of the screen locked interface to the highest. When the screen locked interface is not removed, the user may directly see the system desktop after lighting the screen and cannot see the movement of the screen locked interface. Therefore, the unlocking speed is visually increased.

In this example, the mobile terminal performs the third operation and the fourth operation in parallel on the basis of performing the first operation and the second operation in parallel. The parallel operations may be performed twice, which may further improve the speed of the unlocking process on the mobile terminal. When the second operation is completed before the first operation, the other steps in the unlocking operation are fully performed within the vacated time period after the second operation is completed but the first operation is not completed, instead of waiting for the completion of the first operation, which is beneficial to improving rationality of the unlocking operation on the mobile terminal. Further, the touch display screen may be lighted when the face image matches the preset face template and is the real face image, reducing the power consumption of the mobile terminal.

In one or more embodiments, the first operation and the second operation are performed in parallel as follows. The first operation is performed at a first time point for a first reference duration and the second operation is performed at a second time point for a second reference duration. A time difference between the first time point and the second time point is less than a time difference between the first reference duration and the second reference duration.

The first reference duration is greater than the second reference duration.

The first time point and the second time point may be the same time point or different time points.

For example, the first reference duration is 250 ms (millisecond) and the second reference duration is 80 ms. The time difference between the first reference duration and the second reference duration is 170 ms. When the first time point is 5:32:15:20 PM, the second time point may be any time point between 5:32:15:20 and 5:32:15:190.

In one or more embodiments, a first system resource is allocated to the first operation and the first operation is performed based on the first system resource; and a second system resource is allocated to the second operation and the second operation is performed based on the second system resource. The second system resource is smaller than the first system resource.

The first system resource and the second system resource may be determined according to an optimal allocation record in historical system resource allocation records. The optimal allocation record may be a record where the first operation and the second operation are performed at the fastest speed, or a preset mapping between reference durations required for different operations and resource amounts of system resources required for different operations. The first reference duration is taken as a query identifier to query the mapping to determine the first system resource, and the second reference duration is taken as a query identifier to query the mapping to determine the second system resource. The mobile terminal allocates different system resources according to requirements of different operations, instead of blindly making the first operation and the second operation with the same system resource, thereby reducing the power consumption of the mobile terminal and improving resource allocation accuracy.

In this example, the mobile terminal performs the first operation and the second operation in parallel at different time points, instead of performing the two in parallel at the same time point, such that the first operation and the second operation may be performed in parallel and the corresponding launch time points may also be flexibly controlled. Therefore, the mobile terminal may have additional flexible time period to handle higher-level matters, which is beneficial to improve flexibility of the unlocking operation on the mobile terminal.

In one or more embodiments, the method further includes the following actions. Before matching the feature data of the face image with the feature data of the preset face template, an amount of the feature data is obtained; an amount of system resources required to perform feature data matching is determined based on the amount of the feature data; and the amount of system resources is assigned to perform the operation of matching the feature data with the feature data of the preset face template.

Figure 2B:
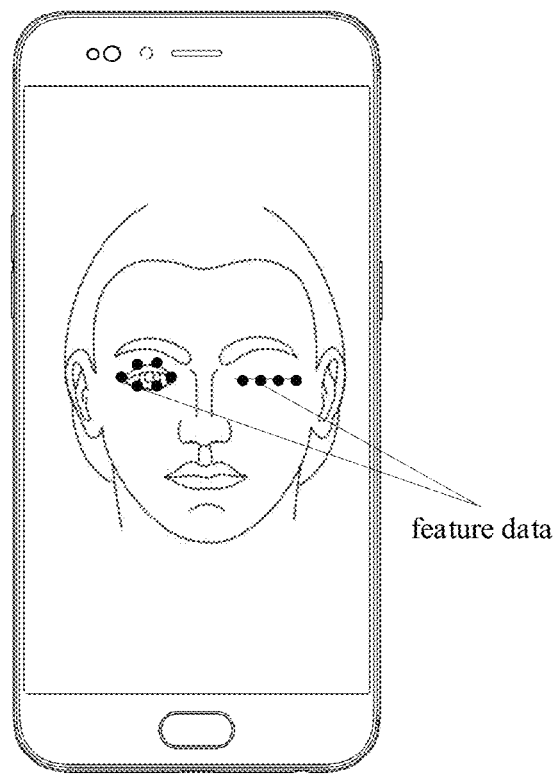
FIG. 2B is a schematic diagram illustrating obtaining feature data of a face by a mobile terminal according to an embodiment of the present disclosure.
Figure 2C:
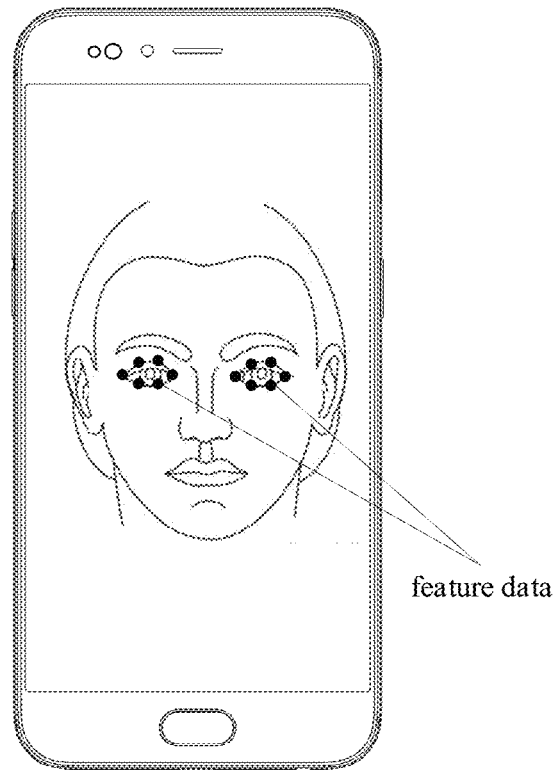
FIG. 2C is a schematic diagram illustrating obtaining feature data of a face by a mobile terminal according to another embodiment of the present disclosure.

When the obtained face images have different expressions, or the obtained face images have different angles, the extracted face features have different data amounts, as illustrated in FIGS. 2B and 2C. When the user opens his eyes or closes his eyes, the amount of the feature data obtained by the mobile terminal is different. FIG. 2B illustrates the amount of 10, and FIG. 2C illustrates the amount of 12.

The implementation manner of determining the amount of system resources required to perform feature data matching based on the amount of the feature data may include: taking a numerical interval of the amount of the feature data as a query identifier; and querying a preset mapping between numerical intervals and amounts of system resources to determine the amount of system resources corresponding to the numerical interval.

In this example, based on difference of the amount of the extracted feature data of the face image, the mobile terminal allocates different amount of system resources due to different calculation amounts of feature matching required to perform different feature data. Therefore, it is beneficial to improve rationality and intelligence of resource allocation of the mobile terminal.

Figure 3:
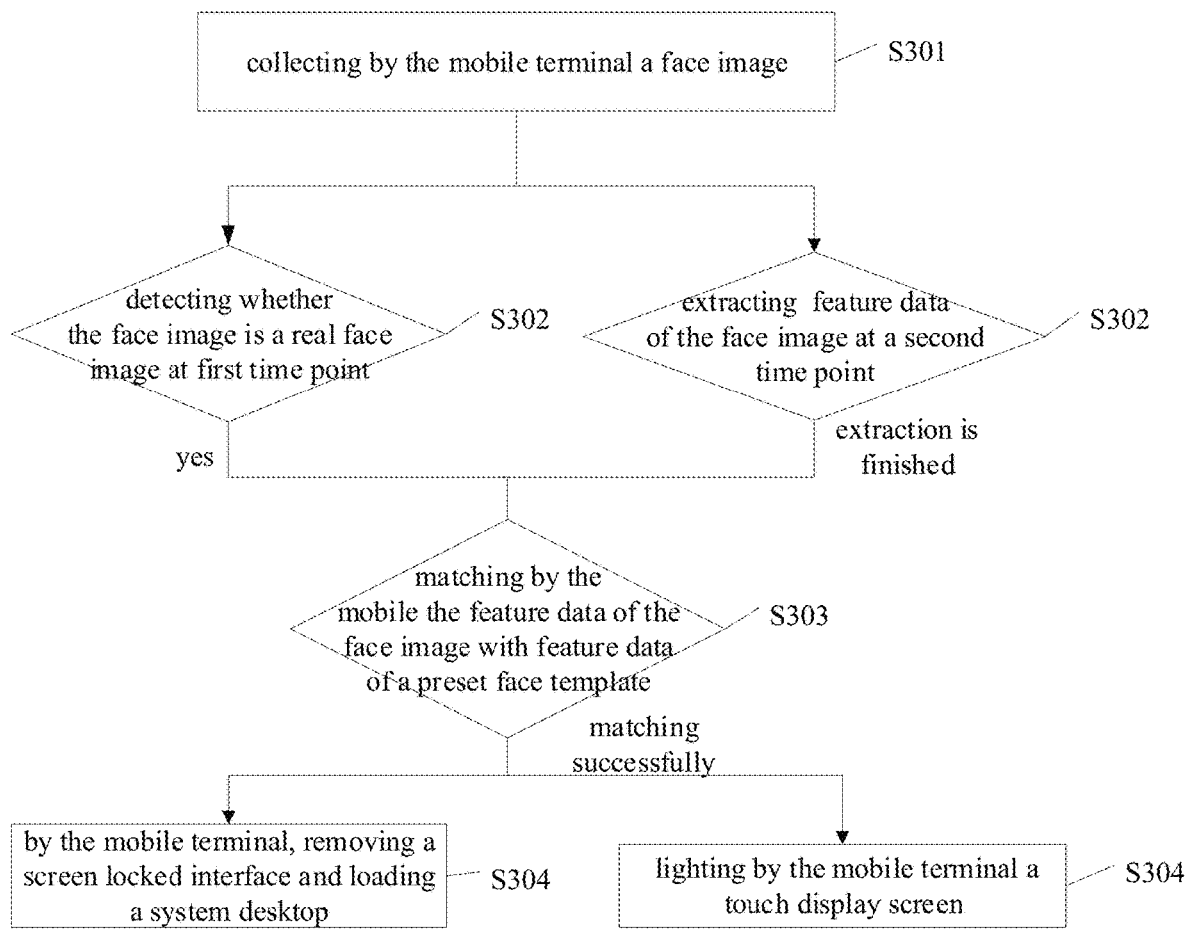
FIG. 3 is a flow chart illustrating an unlocking control method according to another embodiment of the present disclosure.

Consistent with the embodiment illustrated in FIG. 2A, FIG. 3 is a flow chart illustrating an unlocking control method according to an embodiment of the present disclosure. The method may be applicable to the mobile terminal. As illustrated in FIG. 3, the unlocking control method includes the following.

At block S301, the mobile terminal collects a face image.

At block S302, the mobile terminal performs a first operation at a first time point for a first reference duration and a second operation at a second time point for a second reference duration. The first operation is configured to detect whether the face image is a real face image. The second operation is configured to extract feature data of the face image.

The first reference duration is required to perform the first operation and the second reference duration is required to perform the second operation. A time difference between the first time point and the second time point is less than a time difference between the first reference duration and the second reference duration.

At block S303, the feature data is matched with feature data of a preset face template when the feature data of the face image is extracted and the face image is detected to be the real face image.

At block S304, when the feature data matches with the feature data of the preset face template, a third operation and a fourth operation are performed in parallel. The third operation is configured to remove a screen locked interface and load a system desktop, and the fourth operation is configured to light a touch display screen.

In the embodiments of the present disclosure, the face image is collected; the first operation and the second operation are performed in parallel, in which the first operation is to detect whether the face image is the real face image, and the second operation is to extract the feature data of the face image; when the feature data of the face image is extracted, and the face image is detected be the real face image, the feature data of the face image is matched with the feature data of the preset face template; and the unlocking operation is performed when the feature data of the face image matches with the feature data of the preset face template. It may be seen that the security of the face unlocking on the mobile terminal may be improved by means of determining by the mobile terminal whether the face image is the real face image. Further, by performing the first operation and the second operation in parallel, instead of serially performing the first operation and the second operation, it is beneficial to reduce the time consumption and improve the speed of the unlocking control on the mobile terminal. In addition, when the face image is detected to be the real face image, the operation of matching the feature data of the face image with the feature data of the preset face template is performed, rather than blindly performing the matching operation when it is uncertain whether the face image is the real face image, such that it is advantageous to reduce the power consumption of the mobile terminal.

In addition, the mobile terminal performs the first operation and the second operation in parallel at different time points, instead of performing the two in parallel at the same time point, such that the first operation and the second operation may be performed in parallel and the corresponding launch time points may also be flexibly controlled. Therefore, the mobile terminal may have additional flexible time period to handle higher-level matters, which is beneficial to improve flexibility of the unlocking operation on the mobile terminal.

In addition, the mobile terminal performs the third operation and the fourth operation in parallel on the basis of performing the first operation and the second operation in parallel. The parallel operations may be performed twice, which may further improve the speed of the unlocking process on the mobile terminal. Further, the touch display screen may be lighted when the face image matches the preset face template and is the real face image, reducing the power consumption of the mobile terminal.

Figure 4:
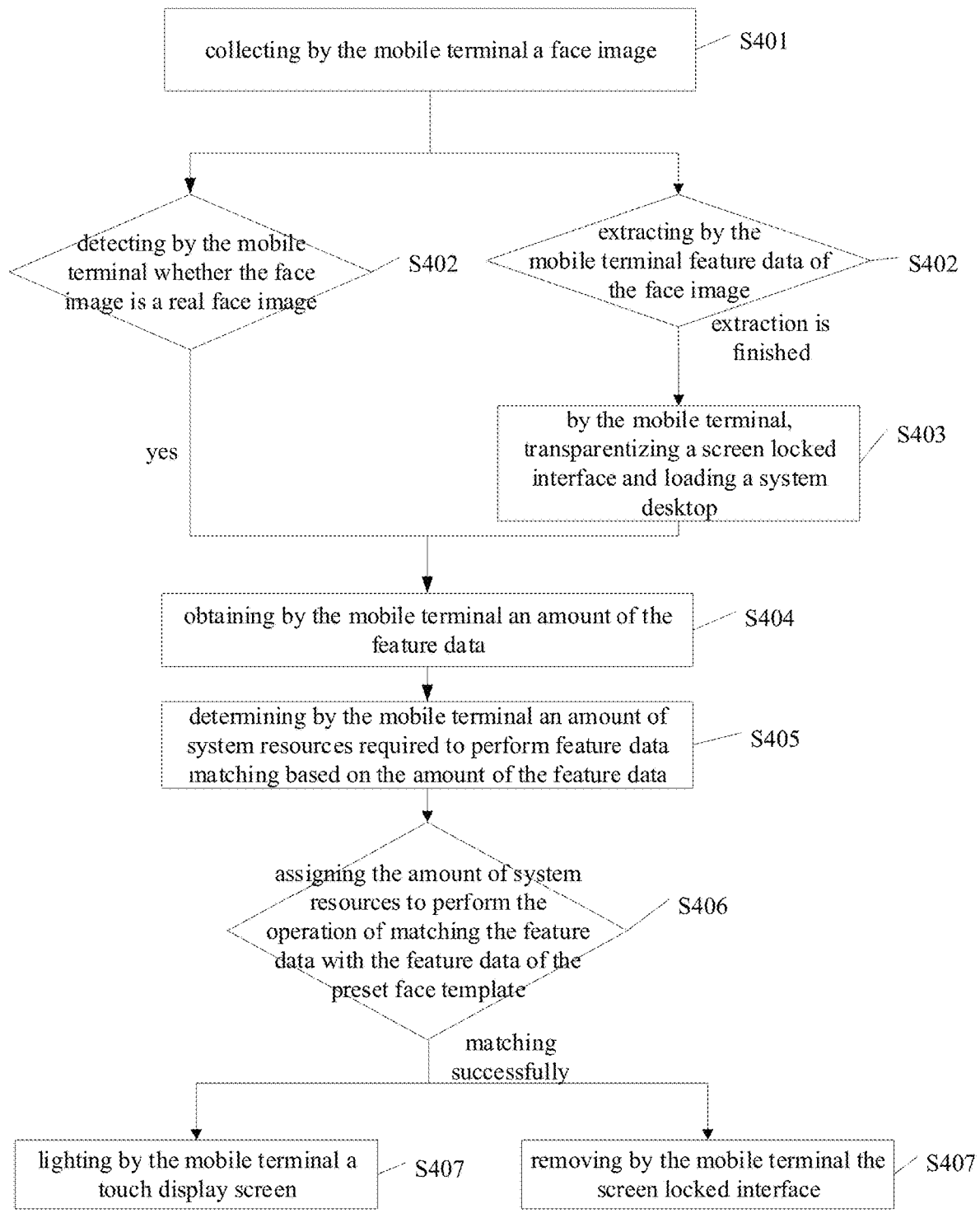
FIG. 4 is a flow chart illustrating an unlocking control method according to another embodiment of the present disclosure.

Consistent with the embodiment illustrated in FIG. 2A, FIG. 4 is a flow chart illustrating an unlocking control method according to an embodiment of the present disclosure. The method may be applicable to the mobile terminal. As illustrated in FIG. 4, the unlocking control method includes the following.

At block S401, the mobile terminal collects a face image.

At block S402, the mobile terminal performs a first operation and a second operation in parallel. The first operation is configured to detect whether the face image is a real face image. The second operation is configured to extract feature data of the face image.

At block S403, when the feature data of the face image is extracted, the mobile terminal transparentizes a screen locked interface and loads a system desktop.

At block S404, when the face image is detected to be the real face image, the mobile terminal obtains an amount of the feature data.

At block S405, the mobile terminal determines an amount of system resources required to perform feature data matching based on the amount of the feature data.

At block S406, the mobile terminal assigns the amount of system resources to perform the operation of matching the feature data with the feature data of the preset face template.

At block S407, when it is detected that the feature data of the face image matches the feature data of the preset face template, the mobile terminal performs a third operation and a fourth operation in parallel. The third operation is configured to light a touch display screen, and the fourth operation is configured to remove the screen locked interface.

In the embodiments of the present disclosure, the face image is collected; the first operation and the second operation are performed in parallel, the first operation is to detect whether the face image is the real face image, and the second operation is to extract the feature data of the face image; when the feature data of the face image is extracted, and the face image is detected be the real face image, the feature data of the face image is matched with the feature data of the preset face template; and the unlocking operation is performed when the feature data of the face image matches with the feature data of the preset face template. It may be seen that the security of the face unlocking on the mobile terminal may be improved by means of determining by the mobile terminal whether the face image is the real face image. Further, by performing the first operation and the second operation in parallel, instead of serially performing the first operation and the second operation, it is beneficial to reduce the time consumption and improve the speed of the unlocking control on the mobile terminal. In addition, when the face image is detected to be the real face image, the operation of matching the feature data of the face image with the feature data of the preset face template is performed, rather than blindly performing the matching operation when it is uncertain whether the face image is the real face image, such that it is advantageous to reduce the power consumption of the mobile terminal.

In addition, the mobile terminal performs the third operation and the fourth operation in parallel on the basis of performing the first operation and the second operation in parallel. The parallel operations may be performed twice, which may further improve the speed of the unlocking process on the mobile terminal. When the second operation is completed before the first operation, the other steps in the unlocking operation are fully performed within the vacated time period after the second operation is completed but the first operation is not completed, instead of waiting for the completion of the first operation, which is beneficial to improving rationality of the unlocking operation on the mobile terminal. Further, the touch display screen may be lighted when the face image matches the preset face template and is the real face image, reducing the power consumption of the mobile terminal.

In addition, based on difference of the amount of the extracted feature data of the face image, the mobile terminal allocates different amount of system resources due to different calculation amounts of feature matching required to perform different feature data. Therefore, it is beneficial to improve rationality and intelligence of resource allocation of the mobile terminal.

Figure 5:
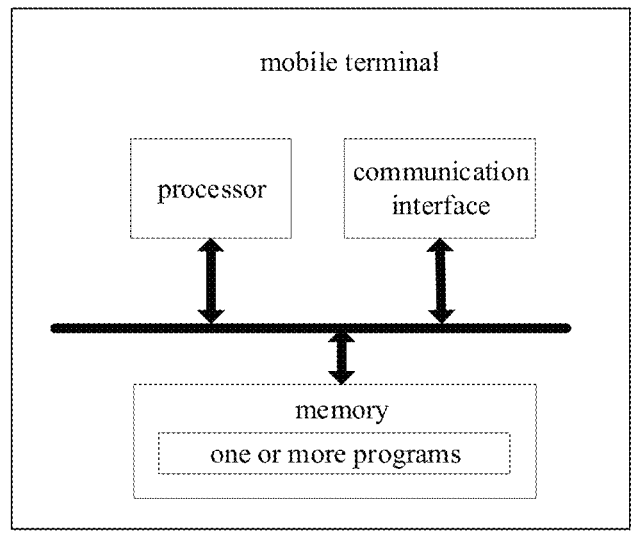
FIG. 5 is a schematic diagram illustrating a mobile terminal according to an embodiment of the present disclosure.

Consistent with the embodiments illustrated in FIGS. 2A, 3 and 4, FIG. 5 is a schematic diagram illustrating a mobile terminal according to an embodiment of the present disclosure. As illustrated in FIG. 5, the mobile terminal includes a processor, a memory, a communication interface, and one or more programs. The one or more programs are stored in the memory and configured to be executed by the processor to implement instructions of the following acts.

A face image is collected.

A first operation and a second operation are performed in parallel. The first operation is configured to detect whether the face image is a real face image. The second operation is configured to extract feature data of the face image.

The feature data of the face image is matched with feature data of a preset face template when the feature data of the face image is extracted and the face image is detected to be the real face image.

An unlocking operation is performed when the feature data of the face image matches the feature data of the preset face template.

In the embodiments of the present disclosure, the face image is collected; the first operation and the second operation are performed in parallel, in which the first operation is to detect whether the face image is the real face image, and the second operation is to extract the feature data of the face image; when the feature data of the face image is extracted, and the face image is detected be the real face image, the feature data of the face image is matched with the feature data of the preset face template; and the unlocking operation is performed when the feature data of the face image matches with the feature data of the preset face template. It may be seen that the security of the face unlocking on the mobile terminal may be improved by means of determining by the mobile terminal whether the face image is the real face image. Further, by performing the first operation and the second operation in parallel, instead of serially performing the first operation and the second operation, it is beneficial to reduce the time consumption and improve the speed of the unlocking control on the mobile terminal. In addition, when the face image is detected to be the real face image, the operation of matching the feature data with the feature data of the preset face template is performed, rather than blindly performing the matching operation when it is uncertain whether the face image is the real face image, such that it is advantageous to reduce the power consumption of the mobile terminal.

In one or more embodiments, performing the unlocking operation may include: performing a third operation and a fourth operation in parallel. The third operation is configured to remove a screen locked interface and load a system desktop. The fourth operation is configured to light a touch display screen.

In one or more embodiments, the method further includes: transparentizing a screen locked interface and loading a system desktop. Performing the unlocking operation may include: performing a third operation and a fourth operation in parallel. The third operation is configured to light a touch display screen. The fourth operation is configured to remove the screen locked interface.

In one or more embodiments, performing the first operation and the second operation in parallel includes: performing the first operation at a first time point for a first reference duration and performing the second operation at a second time point for a second reference duration. A time difference between the first time point and the second time point is less than a time difference between the first reference duration and the second reference duration.

In one or more embodiments, the method further includes: when the feature data of the face image is extracted and the face image is detected to be the real face image, obtaining an amount of the feature data; determining an amount of system resources required to perform feature data matching based on the amount of the feature data; assigning the amount of system resources to perform the operation of matching the feature data with the feature data of the preset face template.

In one or more embodiments, performing the third operation and the fourth operation in parallel includes: performing the third operation at a third time point for a third reference duration and performing the fourth operation at a fourth time point for a fourth reference duration. A time difference between the third time point and the fourth time point is less than a time difference between the third reference duration and the fourth reference duration.

In one or more embodiments, performing the first operation, includes: allocating a first system resource to the first operation and performing the first operation based on the first system resource. Performing the second operation, includes: allocating a second system resource to the second operation and performing the second operation based on the second system resource. The second system resource is smaller than the first system resource.

The foregoing describes the solutions of the embodiments of the present disclosure mainly from the perspective of executing the processes on the method side. It may be understood that, to implement the above functions, the mobile terminal may include corresponding hardware structures and/or software modules for performing various functions. Those skilled in the art will readily appreciate that the present disclosure may be implemented in hardware or in a combination of hardware and computer software in combination with the elements and algorithm steps of the various examples described in the embodiments disclosed herein. Whether a function is implemented in hardware or by driving the hardware by the computer software depends on the specific application and design constraint of the solutions. Those skilled in the art may use different methods for implementing the described functions for each application, but such implementation should not be beyond the scope of the present disclosure.

Division of functional units on the mobile terminal may be performed in the embodiments of the present disclosure according to the foregoing method examples. For example, each functional unit may be divided according to each function, or two or more functions may be integrated into one processing unit. The integrated unit may be implemented in the form of hardware or in the form of a software functional unit. It should be noted that the division of the units in the embodiment of the present disclosure is schematic and is only a logical function division. In actual implementation, there may be another division manner.

Figure 6:
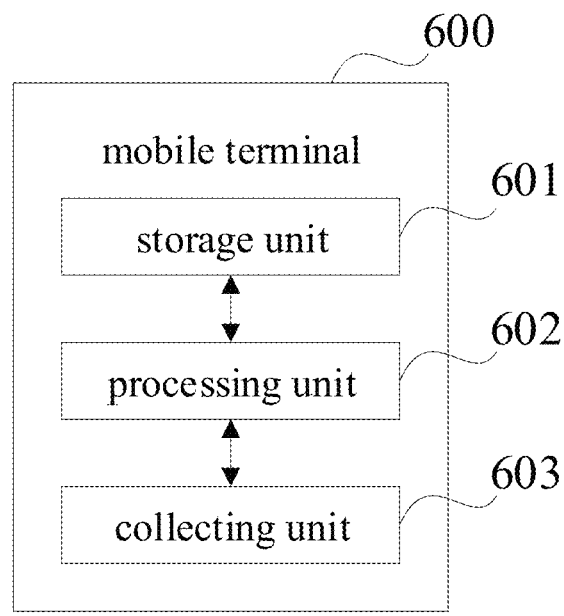
FIG. 6 is a block diagram illustrating a mobile terminal according to an embodiment of the present disclosure.

In the case of employing an integrated unit, FIG. 6 illustrates a block diagram of a possible functional unit composition of the mobile terminal provided in embodiments of the present disclosure. The mobile terminal 600 includes a processing unit 602 and a collecting unit 603. The processing unit 602 is configured to perform control management on acts of the mobile terminal. For example, the processing unit 602 is configured to support the mobile terminal to perform actions in blocks S201-S203 in FIG. 2A, actions in blocks S301-S304 in FIG. 3, and actions in blocks S401-S407 in FIG. 4 and/or other processes of the techniques described herein. The collecting unit 603 is configured to support communication between the mobile terminal and other devices. The mobile terminal may further include a storage unit 601 configured to store program codes and data of the mobile terminal.

The collecting unit 603 is configured to collect a face image.

The processing unit 602 is configured to carry out the following actions. A first operation and a second operation are performed in parallel, in which the first operation is configured to detect whether the face image is a real face image, and the second operation is configured to extract feature data of the face image. The feature data of the face image is matched with the feature data of the preset face template when the feature data of the face image is extracted and the face image is detected to be the real face image. An unlocking operation is performed when the feature data of the face image matches the feature data of the preset face template.

In one or more embodiments, the processing unit 602 is configured to perform the unlocking operation by actions of: performing a third operation and a fourth operation in parallel, in which the third operation is configured to remove a screen locked interface and load a system desktop, and the fourth operation is configured to light a touch display screen.

In one or more embodiments, the processing unit 602 is further configured to carry out the following actions: transparentizing a screen locked interface and loading a system desktop when the feature data of the face image is extracted. The processing unit 602 is configured to perform the unlocking operation by actions of: performing a third operation and a fourth operation in parallel, in which the third operation is configured to light a touch display screen, and the fourth operation is configured to remove the screen locked interface.

In one or more embodiments, the processing unit 602 is configured to perform the first operation at a first time point for a first reference duration and perform the second operation at a second time point for a second reference duration. A time difference between the first time point and the second time point is less than a time difference between the first reference duration and the second reference duration.

In one or more embodiments, the processing unit 602 is configured to carry out the following actions: before matching the feature data of the face image with the feature data of the preset face template, obtaining an amount of the feature data; determining an amount of system resources required to perform feature data matching based on the amount of the feature data; assigning the amount of system resources to perform the operation of matching the feature data with the feature data of the preset face template.

In one or more embodiments, the processing unit 602 is configured to perform the third operation at a third time point for a third reference duration and perform the fourth operation at a fourth time point for a fourth reference duration. A time difference between the third time point and the fourth time point is less than a time difference between the third reference duration and the fourth reference duration.

In one or more embodiments, the processing unit 602 is configured to perform the first operation by actions of allocating a first system resource to the first operation and performing the first operation based on the first system resource. The processing unit 602 is configured to perform the second operation by actions of allocating a second system resource to the second operation and performing the second operation based on the second system resource.

The processing unit 602 may be a processor or a controller. The collecting unit 603 may be a face image collecting device. The storage unit 601 may be a memory.

An embodiment of the present disclosure further provides a computer readable storage medium having stored computer programs for electronic data exchange. The computer programs cause a computer to perform a part of or all acts of any method of the embodiments of the present disclosure as described above. The computer includes a mobile terminal.

An embodiment of the present disclosure further provides a computer program product. The computer program product includes a non-transitory computer readable storage medium storing computer programs. The computer programs are operative to cause a computer to perform a part of or all acts of any method of the embodiments of the present disclosure as described above. The computer program product may be a software installation package. The computer includes a mobile terminal.

It should be noted that, for the foregoing method embodiments, for a brief description, they are all expressed as a series of act combinations, but those skilled in the art should know that the present disclosure is not subject to the described act sequence. Some acts may be performed in other sequences or concurrently in accordance with the present disclosure. Secondly, those skilled in the art should also understand that the embodiments described in the specification are all preferred embodiments, and the acts and modules involved are not necessarily required by the present disclosure.

In the foregoing embodiments, the descriptions of the various embodiments have their respective focuses, and the parts that are not detailed in a certain embodiment may refer to related descriptions of other embodiments.

In the several embodiments provided in the present disclosure, the disclosed device may be implemented in other manners. For example, the device embodiments described above are merely illustrative. For example, the division of the above units is only a logical function division. In actual implementation, there may be another division manner. For example, multiple units or components may be combined or integrated to another system, or some features may be ignored or not executed. In addition, the mutual coupling or direct coupling or communication connection illustrated or discussed may be an indirect coupling or communication connection through some interfaces, devices or units, which may be electrical or otherwise.

The units described above as separate components may or may not be physically separated, and the components displayed as units may or may not be physical units, i.e., the units and components may be in one place or distributed to multiple network units. Some or all the units may be selected according to actual needs to achieve the purpose of the solutions of the embodiments.

In addition, each functional unit in each embodiment of the present disclosure may be integrated into one processing unit, or each unit may exist physically separately, or two or more units may be integrated into one unit. The above integrated unit may be implemented in the form of hardware or in the form of a software functional unit.

The integrated unit described above, if implemented in the form of a software functional unit and sold or used as a standalone product, may be stored in a computer readable memory. Based on such understanding, the technical solutions of the present disclosure essentially, or a part contributing to the prior art in the technical solutions of the present disclosure, or all or part of the technical solutions of the present disclosure may be embodied in the form of a software product. The computer software product is stored in a memory and includes instructions for causing a computer device (which may be a personal computer, server or network device, etc.) to perform all or part of the acts of the above-described methods of various embodiments of the present disclosure. The foregoing memory includes: a U disk, a Read-Only Memory (ROM), a Random Access Memory (RAM), a removable hard disk, a magnetic disk, or an optical disk, and the like, which may store program codes.

Those skilled in the art may understand that all or part of the acts of the foregoing embodiments may be completed by a program to instruct related hardware. The program may be stored in a computer readable memory, and the memory may include: a flash disk, a Read-Only Memory (ROM), a Random Access Memory (RAM), a disk or a CD.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The embodiments of the present disclosure have been described in detail above, and the principles and implementations of the present disclosure are described herein by using specific examples. The description of the above embodiments is only for helping to understand the method of the present disclosure and its core ideas. It would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A mobile terminal, comprising:
a processor;
a face image collecting device, configured to collect a face image; and
a memory, configured to store feature data of a preset face template;
the processor being configured to carry out following actions, comprising:
performing a first operation and a second operation in parallel, the first operation being configured to detect whether the face image is a real face image, the second operation being configured to extract feature data of the face image;
matching the feature data of the face image with the feature data of the preset face template when the feature data of the face image is extracted and the face image is detected to be the real face image; and
performing an unlocking operation when the feature data of the face image matches the feature data of the preset face template:
wherein, performing the first operation, comprises:
allocating a first system resource to the first operation and performing the first operation based on the first system resource;
wherein, performing the second operation, comprises:
allocating a second system resource to the second operation and performing the second operation based on the second system resource;

wherein, the second system resource is smaller than the first system resource, the first system resource and the second system resource are determined according to an optimal allocation record in historical system resource allocation records.

2. The mobile terminal of claim 1, wherein, performing the unlocking operation comprises:

performing a third operation and a fourth operation in parallel, the third operation being configured to remove a screen locked interface and load a system desktop, and the fourth operation being configured to light a touch display screen.

3. The mobile terminal of claim 2, wherein the processor is configured to perform the third operation at a third time point for a third reference duration and perform the fourth operation at a fourth time point for a fourth reference duration, wherein a time difference between the third time point and the fourth time point is less than a time difference between the third reference duration and the fourth reference duration.

4. The mobile terminal of claim 1, wherein, the processor is further configured to carry out following actions, comprising:

transparentizing a screen locked interface and loading a system desktop when the feature data of the face image is extracted;

wherein, performing the unlocking operation comprises:

performing a third operation and a fourth operation in parallel, the third operation being configured to light a touch display screen, and the fourth operation being configured to remove the screen locked interface.

5. The mobile terminal of claim 1, wherein, the processor is configured to perform the first operation at a first time point for a first reference duration and perform the second operation at a second time point for a second reference duration, wherein a time difference between the first time point and the second time point is less than a time difference between the first reference duration and the second reference duration.

6. The mobile terminal claim 1, wherein, the processor is further configured to carry out following actions, comprising:

before matching the feature data of the face image with the feature data of the preset face template, obtaining an amount of the feature data;

determining an amount of system resources required to perform feature data matching based on the amount of the feature data;

assigning the amount of system resources to perform the operation of matching the feature data with the feature data of the preset face template.

7. The mobile terminal of claim 1, wherein the optimal allocation record is a record where the first operation and the second operation are performed at a fastest speed, or a preset mapping between reference durations required for different operations and resource amounts of system resources required for different operations.

8. An unlocking control method, comprising:

collecting a face image;

performing a first operation and a second operation in parallel, the first operation being configured to detect whether the face image is a real face image, the second operation being configured to extract feature data of the face image;

matching the feature data of the face image with feature data of a preset face template when the feature data of the face image is extracted and the face image is detected to be the real face image; and performing an unlocking operation when the feature data of the face image matches the feature data of the preset face template;

wherein, performing the first operation, comprises: allocating a first system resource to the first operation and performing the first operation based on the first system resource;

wherein, performing the second operation, comprises: allocating a second system resource to the second operation and performing the second operation based on the second system resource;

wherein, the second system resource is smaller than the first system resource, the first system resource and second system resource are determined according to an optimal allocation record in historical system resource allocation records.

9. The method of claim 8, wherein, performing the unlocking operation, comprises:

performing a third operation and a fourth operation in parallel, the third operation being configured to remove a screen locked interface and load a system desktop, and the fourth operation being configured to light a touch display screen.

10. The method of claim 9, wherein performing the third operation and the fourth operation in parallel comprises:

performing the third operation at a third time point for a third reference duration and performing the fourth operation at a fourth time point for a fourth reference duration, wherein a time difference between the third time point and the fourth time point is less than a time difference between the third reference duration and the fourth reference duration.

11. The method of claim 8, wherein, the method further comprises:

transparentizing a screen locked interface and loading a system desktop when the feature data of the face image is extracted;

wherein, performing the unlocking operation, comprises:

performing a third operation and a fourth operation in parallel, the third operation being configured to light a touch display screen, and the fourth operation being configured to remove the screen locked interface.

12. The method of claim 8, wherein performing the first operation and the second operation in parallel comprises:

performing the first operation at a first time point for a first reference duration and performing the second operation at a second time point for a second reference duration, wherein a time difference between the first time point and the second time point is less than a time difference between the first reference duration and the second reference duration.

13. The method of claim 8, wherein, the method further comprises:

before matching the feature data of the face image with the feature data of the preset face template, obtaining an amount of the feature data;

determining an amount of system resources required to perform feature data matching based on the amount of the feature data;

assigning the amount of system resources to perform the operation of matching the feature data with the feature data of the preset face template.

14. The method of claim 8, wherein the optimal allocation record is a record where the first operation and the second operation are performed at a fastest speed, or a preset mapping between reference durations required for different operations and resource amounts of system resources required for different operations.

15. A non-transitory computer readable storage medium having stored computer programs for electronic data exchange, wherein the computer programs cause a computer to perform an unlocking control method, the method comprising:
    collecting a face image;
    performing a first operation and a second operation in parallel, the first operation being configured to detect whether the face image is a real face image, the second operation being configured to extract feature data of the face image;
    matching the feature data of the face image with feature data of a preset face template when the feature data of the face image is extracted and the face image is detected to be the real face image; and
    performing an unlocking operation when the feature data of the face image matches the feature data of the preset face template,
    wherein, performing the first operation, comprises: allocating a first system resource to the first operation and performing the first operation based on the first system resource;
    wherein, performing the second operation, comprises: allocating a second system resource to the second operation and performing the second operation based on the second system resource;
    wherein, the second system resource is smaller than the first system resource, the first system resource and the second system resource are determined according to an optimal allocation record in historical system resource allocation records.

16. The non-transitory computer readable storage medium of claim 15, wherein performing the unlocking operation, comprises:
    performing a third operation and a fourth operation in parallel, the third operation being configured to remove a screen locked interface and load a system desktop, and the fourth operation being configured to light a touch display screen.

17. The non-transitory computer readable storage medium of claim 16, wherein performing the third operation and the fourth operation in parallel comprises:
    performing the third operation at a third time point for a third reference duration and the fourth operation at a fourth time point for a fourth reference duration, wherein a time difference between the third time point and the fourth time point is less than a time difference between the third reference duration and the fourth reference duration.

18. The non-transitory computer readable storage medium of claim 15, wherein, the method further comprises:
    transparentizing a screen locked interface and loading a system desktop when the feature data of the face image is extracted;
    wherein, performing an unlocking operation, comprises:
    performing a third operation and a fourth operation in parallel, the third operation being configured to light a touch display screen, and the fourth operation being configured to remove the screen locked interface.

19. The non-transitory computer readable storage medium of claim 15, wherein performing the first operation and the second operation in parallel comprises:
    performing the first operation at a first time point for a first reference duration and performing the second operation at a second time point for a second reference duration, wherein a time difference between the first time point and the second time point is less than a time difference between the first reference duration and the second reference duration.

20. The non-transitory computer readable storage medium of claim 15, wherein the method further comprises:
    before matching the feature data of the face image with the feature data of the preset face template, obtaining an amount of the feature data;
    determining an amount of system resources required to perform feature data matching based on the amount of the feature data;
    assigning the amount of system resources to perform the operation of matching the feature data with the feature data of the preset face template.

* * * * *